G. T. SMITH.
FLOUR MILLING MACHINERY.
APPLICATION FILED FEB. 28, 1919.
1,377,976.
Patented May 10, 1921.
4 SHEETS—SHEET 2.
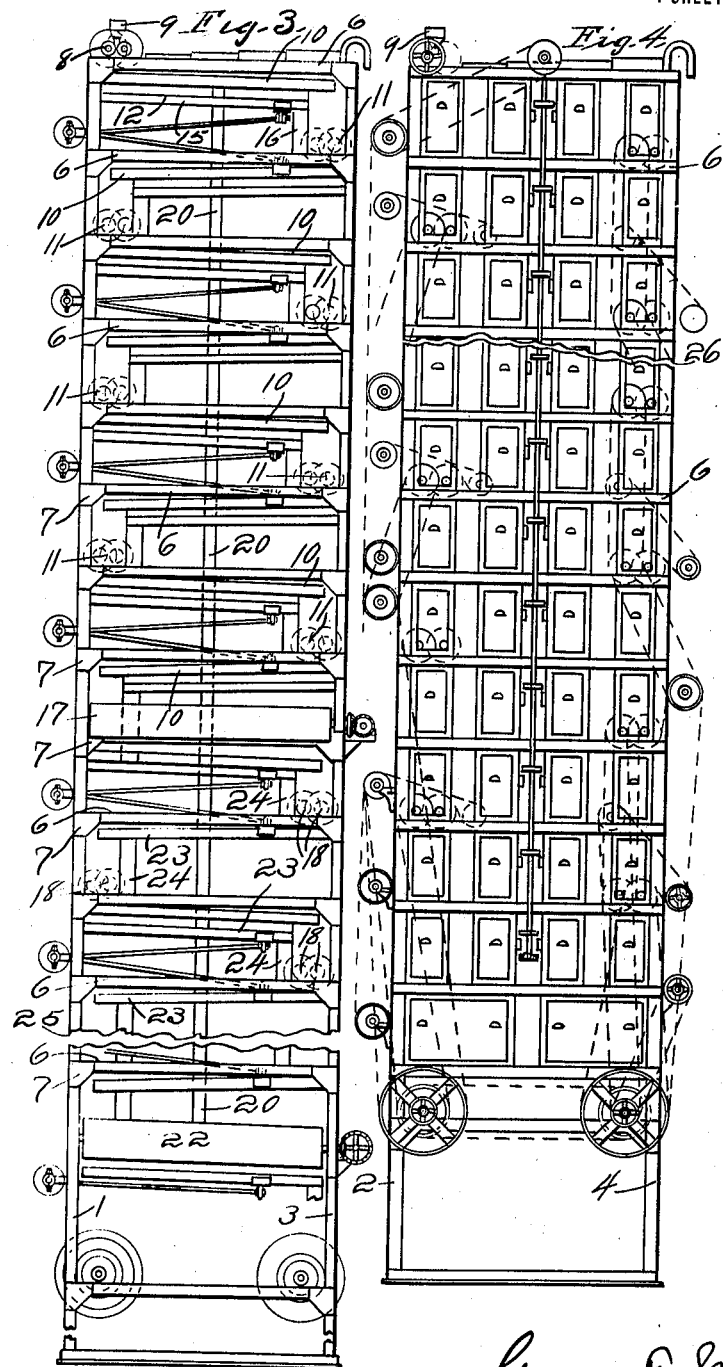
Inventor
George T. Smith,
By A. D. Jackson
Attorney

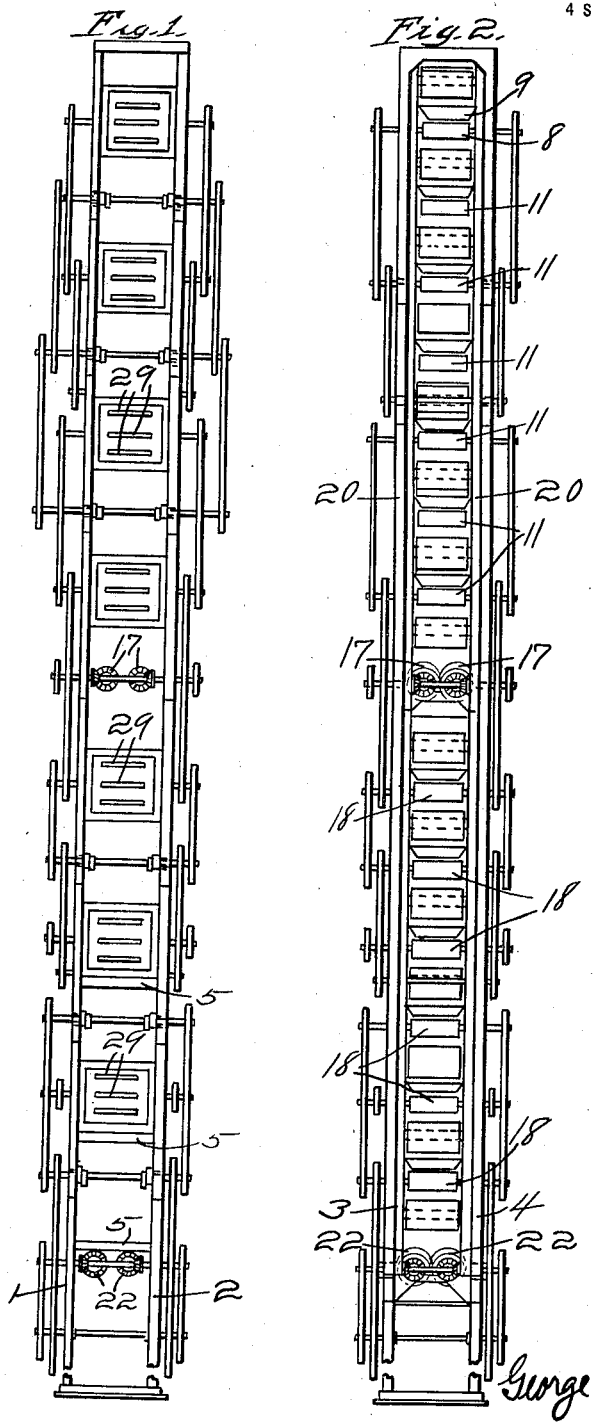

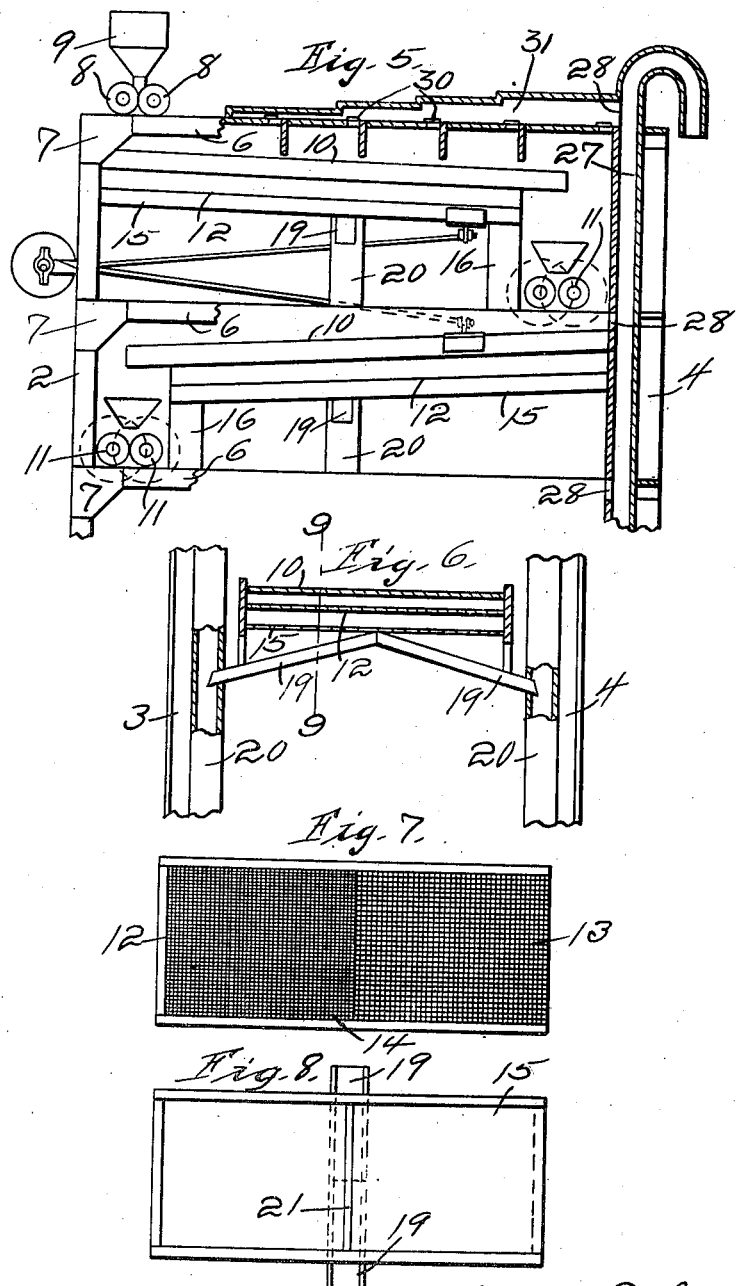

G. T. SMITH.
FLOUR MILLING MACHINERY.
APPLICATION FILED FEB. 2⸱, 1919.
1,377,976.
Patented May 10, 1921.
4 SHEETS—SHEET 4.
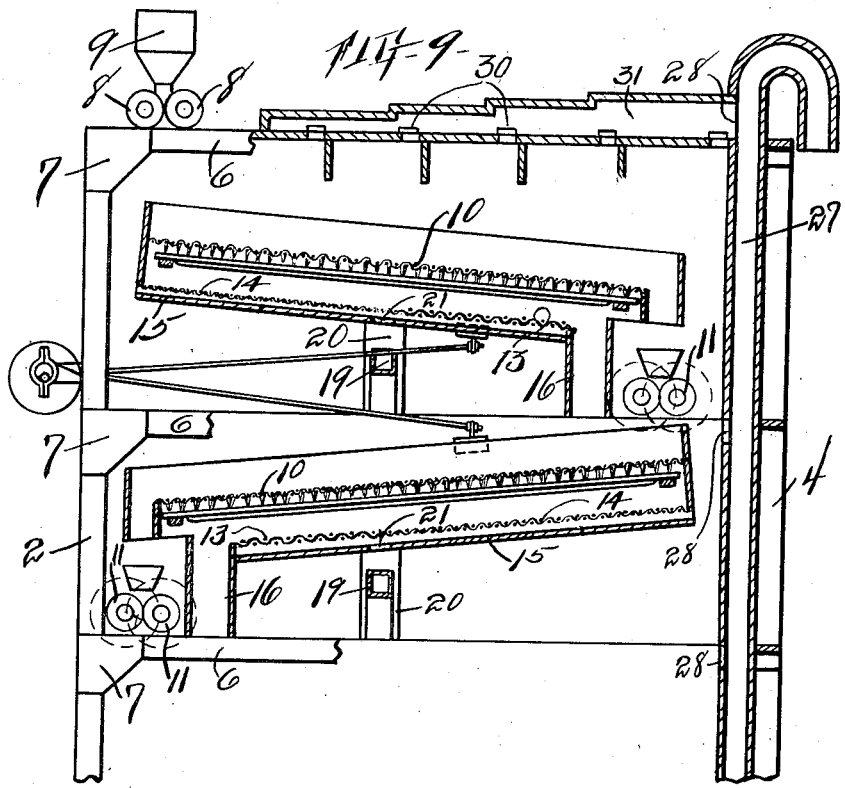
Inventor
GEORGE T. SMITH
By A. L. Jackson
Attorney

UNITED STATES PATENT OFFICE.

GEORGE T. SMITH, OF WICHITA FALLS, TEXAS, ASSIGNOR OF SEVENTEEN AND TWO-THIRDS PER CENT. TO DAISY DELL SHELDON, AND ONE-THIRD TO C. P. SHELDON, BOTH OF WICHITA FALLS, TEXAS.

FLOUR-MILLING MACHINERY.

1,377,976.      Specification of Letters Patent.      Patented May 10, 1921.

Application filed February 28, 1919. Serial No. 279,717.

*To all whom it may concern:*

Be it known that I, GEORGE T. SMITH, a citizen of the United States of America, residing at Wichita Falls, in the county of Wichita and State of Texas, have invented certain new and useful Improvements in Flour-Milling Machinery, of which the following is a specification.

My invention relates to methods and machines for milling flour and the like, the general object being to reduce the initial cost of the equipment required for a given output, to decrease the floor space and cost of attendance required for the same, to improve the quality of the flour and the percentage of good flour obtainable from a given quantity of grain, and to improve the actual quality of the resulting flour. My invention provides breaking, sifting, and purifying means, together with transmission means in an unusually compact, inexpensive, and easily operated form, and which requires much less than the usual amount of power and lubricants. My invention provides machinery and methods for retaining an unusually high proportion of the nutritive ingredients of the wheat or other cereal in the flour without impairing the palatability of the latter. I provide methods and machinery for securing a high output of starchy white flour and vitamins and protein without losing the fine natural flavor which heretofore has been lost in the shorts and bran. The roller mill process as commonly used, eliminates a considerable proportion of edible ingredients from the flour, recognized as being of high importance as food for human beings.

I also provide a method of milling adapted to employing standard and successfully tested machinery and equipment which will retain the quality and natural flavor in the bread or cake baked from such flour. I accomplish these objects partly by maintaining a relatively even temperature and avoiding repeated heating and cooling or alternate heating and cooling during the various stages of the milling process partly by effectively purifying the product at each step of its reduction, partly by preventing the undesirable chopping or pulverizing of the particles of the wheat coating which ought not to go into the flour, and partly by effectively removing these undesirable particles. Such undesirable chopping or pulverizing is done by frequently elevating stock. My invention provides a method of milling which will eliminate a large share of the elevators heretofore used in flour milling practice, and which will permit the requisite machinery to be much more compactly erected and to be operated at less expense.

My invention employs the most effective means for purifying the meal and for preventing the undesirable particles from being pulverized and mixed into the flour by elevators. In making the original break of the wheat grain, it is well known that the break rolls do not remove the rather fibrous thin outer coatings. In my new process of milling, these are stripped from the grain portions to which they were previously attached and they are removed by air drafts passing up through the separating sieves and up through the thin layers of stock passing on the sieves and then out through the dust collector. Even if these particles are so fine that they may pass through the next sieve into the flour, they can be removed by the air process.

Still further and to some extent more detailed objects will appear from the following explanation and from the accompanying drawings, it being obvious that the details of construction and arrangement might be widely varied without departing from the spirit of my invention.

In the drawings, Figure 1 is an exterior elevation of a complete milling or flour making system. Fig. 2 is an interior elevation of the same, showing the location of two sets of reels. Fig. 3 is an interior side elevation, showing the break rolls and the separating sieves and distributing chutes. Fig. 4 is an exterior side elevation of the milling system, showing the driving gear diagrammatically and in conventional form. Fig. 5 is a vertical section of part of the milling system, showing the mechanism for separating the flour and middlings and tailings and for distributing. Fig. 6 is a broken vertical cross-section of a separating sieve, a distributing pan, and the distributing chutes. Fig. 7 is a plan view of the two part separating sieve which is used between each set of break rolls. Fig. 8 is a plan view of the accompanying two part distributing pan used with each sieve. Fig. 9 is a vertical longitudinal section, taken substantially along the line 9—9 of Fig. 6.

Similar characters of reference are used to indicate the same parts throughout the several views.

On account of the extent of the milling machinery, the main views of the drawings could be presented only diagrammatically, and more detailed drawings of many parts are not necessary, as such parts as the driving gear, break rolls, sieves, eccentric gearing, and other parts are of standard types, and the driving gear and other well known elements will not be described in detail.

One important feature of the improved mill is that only one continuous frame is used in the mill proper. The frame is preferably constructed of metal throughout and consists of uprights 1, 2, 3, and 4 and cross beams 5 and 6, the cross-beams 5 and 6 being connected to the uprights by angle brackets or connecting plates 7 and suitable rivets and the pieces forming the uprights also being connected by the plates 7. A frame of this character can be constructed for as many sets of break rolls as may be required. With such arrangement of a frame, elevators, as heretofore used in flour milling, are dispensed with. In this manner the frequent changes in the temperature in the stock is avoided. Frequent heating and cooling of the stock destroys the flavor of the flour just as in cooking other food over after it has been cold. The stock, where elevators are used, would be alternatively warmed by the break rolls and cooled in the elevation of the stock. The dispensing with the elevators also avoids unnecessarily hammering and pounding the stock which kills much of the flour and makes what is known as dead flour, the cells being destroyed by the pounding and hammering by much machinery.

In the improved machine, the flow is always down and never up. The wheat is fed to the first break rolls 8 through a hopper 9. The products fall on the first sieve 10 which is shaken and vibrated in the usual manner. The broken wheat and bran are tailed over and fall to the next break rolls 11 and the flour and middlings pass through the sieve 10 and fall on the separating sieve 12. The sieve 12 is a two-part sieve, having a finer portion 14 and a coarser portion 13. The part 14 lets the flour fall through to the pan 15 and the part 13 carries the middlings to the chute 16. The construction and arrangement of the sieves 10, 12, and the pan 15 are substantially the same after each pair of break rolls 11. The break rolls 11 alternate from end to end of each unit with each sieve 10 carrying the tailings to the break rolls until the first or bran reels 17. The bran is all taken from the bran wheels 17 out of the machine or mill together with bran duster flour which is used for feed or paste. The last chute 16 delivers the middlings to the first set of reduction rolls 18 below the bran reels 17. The flour that falls through the part 14 of the separating sieve falls on the pan 15 and is delivered to the chutes 19 through a slot 21. The chutes 19 are rigid with the pan 15 and so are vibrated with the pan. The chutes 19 deliver the flour to the chutes 20 which deliver the flour directly to the bolting reels 22 at the bottom of the machine or mill. The chutes 20 are preferably made of some flexible material, cloth or leather. From the part of the machine or mill above the reels 17, the middlings are delivered from each sieve 12 to the first reduction rolls 18 below the bran reels 17 and the flour is delivered from each sieve 12 to the bolting reels 22.

Below the bran reels 17, the middlings are tailed over from a separating sieve 23 to each set of reduction rolls 18 and the flour passes through the sieve 23 and is delivered to a chute 24 and from the chutes 24, the flour is delivered directly to the bolting reels 22. It is apparent that the number of break rolls may be varied more or less. Fig. 3 shows a break at 25 and Fig 4 shows a break at 26. The reels are preferably driven by bevel gearing at the ends of the machine or mill.

Provision is made for treating the stock and flour, as set forth in former patents to me, with air drafts. An air flue 27 is provided at one end of the machine inside the frame and provided with ports 28. A suction draft is created in the flue 27 and slight drafts of air are constantly drawn through the separating sieves and through the whole body or layer of stock or flour as they are being moved along on the separating sieves. All the flour and all the broken wheat and bran are constantly treated with the air draft which takes out all ergot or smut and all finely ground fiber and dust, these materials, being lighter than flour, pass out with the air draft to the dust collector.

A horizontal suction chamber 31 is located on the top of the top section or unit for conducting the draft to the vertical flue 27, as in the patents issued to me September 21, 1915, Nos. 1,154,067 and 1,154,547. This chamber is provided with valves 30 for regulating the air draft.

The necessary air for cleaning the flour and broken wheat is admitted into the casings through slots 28. More or fewer of such slots may be provided. The greater part of the air will be drawn upwardly on account of more ports in the upper part of the casing being provided, and valves 30 are provided for regulating the draft which is passing through the separating sieves and stock.

I claim as my invention:

1. A flour milling system comprising a single flow consisting of a suitable casing, breaking rolls and sieves arranged in alternate formation in a single downward path, bran reels intermediate the upper and lower parts of the casing, chutes for delivering the bran to said bran reels, chutes for delivering middlings to reduction rolls below said reels, bolting reels at the lower end of said casing, and chutes for delivering flour from separating sieves above and below said bran reels to said bolting reels.

2. In a flour milling system, a single casing formed of a number of units, breaking rolls and sieves arranged in alternate formation in a single downward path, bran reels mounted in said casing approximately midway between the upper and lower parts of said casing, bolting reels mounted at the lower end of said casing, separating sieves above said bran reels for tailing over bran until all bran is delivered to said bran reels, chutes for delivering all flour from all the sieves to said bolting reels, and chutes for delivering middlings from above said bran reels to reduction rolls below said bran reels.

3. In a flour milling system, a single casing formed of a number of units, breaking rolls and sieves arranged in alternate formation in a single downward path in said casing, bran reels in said casing midway between the upper and lower ends thereof, the separating sieves above said bran reels delivering all bran to said bran reels, chutes for delivering all middlings to breaking rolls below said bran reels, vertical chutes in said casing on both sides of said sieves, pans for receiving flour from said sieves, and lateral included chutes for delivering flour from said pans to said vertical chutes, said vertical chutes delivering all flour to said bolting reels.

4. In a flour milling system, a single casing formed of a number of units, breaking rolls and sieves arranged in alternate formation in a single downward path in said casing, bran reels in said casing approximately midway between the upper and lower ends thereof, the sieves above said bran reels delivering all bran to said bran reels, bolting reels at the lower end of said casing, one sieve of each unit having fabric of fine mesh for the passage of flour and a part thereof having coarse mesh for the passage of middlings, a divided pan in each unit, one part receiving flour from said fine mesh and the other part receiving middlings from said coarse mesh, means for delivering all middlings above said bran reels to reduction rolls below said bran reels, and means for delivering all flour from all the units to said bolting reels.

5. In a flour milling system, a single casing formed of a number of units, breaking rolls and sieves arranged in alternate formation in a single downward path in said casing, bran reels in said casing approximately midway between the upper and lower ends of said casing, means for delivering all bran to said bran reels, bolting reels at the lower end of said casing, means for delivering all middlings above said bran reels to reduction rolls below said bran reels, vertical chutes in each side of said casing leading to said bolting reels, means in each unit for collecting the flour, and lateral chutes communicating with said vertical chutes, for delivering the flour thereto.

6. In a flour milling system, a single casing formed of a number of units, breaking rolls and sieves arranged in alternate formation in a single downward path in said casing, bran reels in said casing approximately midway between the upper and lower ends thereof and bolting reels at the lower end of said casing, means for delivering all bran to said bran reels, means for delivering all middlings above said bran reels to reduction rolls below said bran reels, means for delivering all flour from each unit direct to said bolting reels, and means for removing all the stock in each unit lighter than flour consisting of means for forcing slight drafts of air through all sieves and through layers of stock moving on the sieves.

In testimony whereof, I set my hand, this 18th day of February, 1919.

GEORGE T. SMITH.